United States Patent Office 3,679,468
Patented July 25, 1972

3,679,468
PROCESS FOR THE ANTISTATIC TREATMENT OF LINEAR CRYSTALLIZABLE POLYESTERS AND PRODUCTS THUS TREATED
Roland Feinauer, Werner Thier, and Wolfgang Schneider, Marl, Germany, assignors to Chemische Werke Huls, A.G., Marl, Germany
No Drawing. Filed Apr. 21, 1970, Ser. No. 30,606
Claims priority, application Germany, Apr. 26, 1969, P 19 21 527.1
Int. Cl. D06m *15/00;* B44d *1/22*
U.S. Cl. 117—138.8 F
15 Claims

ABSTRACT OF THE DISCLOSURE

Shaped antistatic polyester articles of manufacture are produced by applying to the surface thereof a compound having the formula:

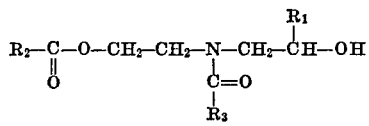

wherein $R_1$ is hydrogen or methyl and $R_2$ and $R_3$ each is an aliphatic group containing 1 to 17 carbon atoms, inclusive, at least one of which contains 11 to 17 carbon atoms, inclusive, and thereafter, to render the antistatic treatment permanent, heat setting at, e.g., 120–140° C.

BACKGROUND OF THE INVENTION

This invention relates to a process for the antistatic treatment of shaped articles of linear crystallizable polyesters.

It is known that shaped articles of synthetic crystallizable polyesters, e.g., films and threads, fibers, yarns, woven fabrics and knitted fabrics formed therefrom, are charged by static electricity by friction during processing or during use. This static charging interferes substantially with the processing and usage of such shaped articles. Consequently, a number of antistatic agents are in use which seek to avoid this static charging phenomenon.

The auxiliary agents usable for an antistatic treatment can be anionic, cationic, or nonionic products. In addition to antistatic agents which are not wash-fast, i.e., removed from the surface of the shaped article by a few washings, permanent antistatic agents of a wide variety of chemical compound classes are likewise known.

Permanent antistatic agents, i.e., those which are wash-fast, are products which are, e.g., precipitated or otherwise permanently set onto the surface of the shaped article, or which generate the antistatic agent onto the surface by crosslinking. (See W. Bernard, "Appretur der Textilien," Springer Publishers, 1967, p. 291.) The commercially available "permanent" antistatic agents actually are effective for a relatively limited time. Moreover, these products and/or the processes for the use thereof, have a number of disadvantages with respect to their use for the antistatic treatment of shaped articles of synthetic linear polyesters.

Antistatic effects obtained by cross-linking a compound onto the surface of shaped articles entail an oftentimes considerable impairment of the surface characteristics thereof, e.g., the hand or texture thereof or adhesion properties, due to the rigidity of the antistatic layer. Other methods for achieving a permanent antistatic treatment require a multi-stage treatment which is technically complicated, such as, for example, treatment with a quaternary ammonium compound followed by a setting step with an anionic compound.

Accordingly, it is an objective of this invention to provide a process for obtaining a permanent antistatic treatment of shaped polyester articles in a technically simple manner. Another object is the provision of such a process without impairment of the surface characteristics thereof, e.g., adhesion characteristics.

SUMMARY OF THE INVENTION

According to this invention, antistatic effects on shaped polyester articles are achieved employing as the antistatic agent, a compound of the general formula:

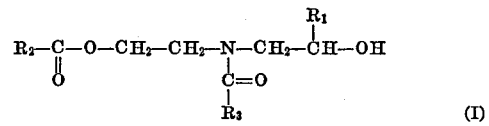

wherein $R_1$ is hydrogen or methyl and $R_2$ and $R_3$ each is a straight-chain or branched, saturated aliphatic group containing 1 to 17 carbon atoms, at least one of which contains 11 to 17 carbon atoms.

DETAILED DESCRIPTION OF THE INVENTION

Antistatic compounds of Formula I employed in the process of this invention include those wherein $R_2$ and $R_3$ are alkyl groups, e.g., methyl, ethyl, propyl, isopropyl, butyl, isobutyl, pentyl, hexyl, heptyl, octyl, undecyl, pentadecyl and heptadecyl.

The ester amides of Formula I can be produced in a simple manner by reacting diethanolamine or ethanol isopropanolamine or the 4,6-dioxa-1-azabicyclo-[3,3,0]-octanes described in French Pat. 1,518,386 with the appropriate carboxylic acids, i.e., those whose acyl radical corresponds to the desired acyl radical of the compounds of Formula I.

A preferred class are those of Formula I wherein $R_2$ and $R_3$ contain a total of up to 22 carbon atoms, e.g., those wherein at least one of $R_2$ and $R_3$ undecanyl and the other is, e.g., an alkyl group named above.

Antistatic compounds particularly suitable for use in the process of this invention are:

N-(2-hydroxyethyl)-N-(2-lauroyloxyethyl)-lauric acid amide;
N-[(2-hydroxy-2-methyl)-ethyl]-N-(2-lauroyloxyethyl)-lauric acid amide;
N-(2-hydroxyethyl)-N-(2-lauroyloxyethyl)-acetamide;
N-[(2-hydroxy-2-methyl)-ethyl]-N-(2-lauroyloxyethyl)-acetamide;
N-(2-hydroxyethyl)-N-(2-acetoxyethyl)-lauric acid amide;
N-(2-hydroxyethyl)-N-(2-stearoyloxyethyl)-acetamide;
N-(2-hydroxyethyl)-N-(2-palmitoyloxyethyl)-butyric acid amide; and
N-(2-hydroxyethyl)-N-(2-propionyloxyethyl)-lauric acid amide.

A class of polyesters are linear solid polyesters of a polyfunctional acid, e.g., phthalic acid, isophthalic acid, terephthalic acid etc., and a polyfunctional alcohol, e.g., ethylene glycol, propylene glycol, diethylene glycol, 1,4-bis-(hydroxymethyl)-cyclohexane etc. Shaped articles produced from linear, synthetic crystallizable polyesters of the type of ethylene glycol terephthalate polyesters and 1,4-bis-(hydroxymethyl)-cyclohexane terephthalate polyesters are preferred.

The shaped articles of manufacture which are treated according to the process of this invention include those in the form of threads, fibers, yarns, and knitted or woven fabrics produced therefrom, as well as strips, films, and other molded, extruded or otherwise shaped articles of manufacture. Especially suitable for rendering antistatic according to the process of this invention are shaped articles, e.g., fibers, yarns, and knitted and woven fabrics, etc., of poly-[1,4-bis-(hydroxymethyl)-cyclohexane terephthalate]polyesters.

In carrying out the process of this invention, a compound of Formula I is applied, e.g., from an aqueous bath or from an inert solvent, to the surface of the shaped polyester article, in an amount sufficient to achieve an antistatic effect, usually 0.1–10%, based on the shaped article to which it is applied. The antistatic effect is rendered permanent by heat setting the treated article, e.g., at a temperature of 120 to 240° C.

The process of the invention is generally conducted by applying a compound of Formula I to the surface of the shaped articles of linear, saturated polyesters, e.g., as an aqueous emulsion or a solution in an inert solvent, preferably perchloroethylene, and thereafter removing the excess emulsion or solution, to provide a substantially uniform coating of the antistatic compound to the surface of the shaped article. Additional suitable solvents are, for example, methylene chloride, carbon tetrachloride, chloroform, methanol, ethanol, isopropanol, acetone, methyl ethyl ketone, and butyl acetate.

The application of the antistatic compound of this invention can be effected by any convenient means, e.g., spraying, or preferably in a padder and subsequently squeezing out the excess between press rolls to achieve the desired degree of take up. The concentration of the emulsion or of the solution and, for example, the squeezing out of the excess solution, both are chosen so that the ester amides of Formula I are applied to the surface of the molded articles in the desired amount, e.g., 0.1–10%, preferably 1–5%, calculated on the weight of the shaped articles. In general, an aqueous emulsion or solvent solution of the antistatic agent of a concentration of about 1 to 20% by weight is usually employed for this purpose. Simple experiments can be employed to determine the concentration of the antistatic agent which should be applied on the surface of the molded article to achieve the desired improvement in antistatic properties.

After applying a compound of this invention to the surface of the polyester article, the coated articles are then dried and heated to set the antistatic agent on to the surface and provide a permanent antistatic effect. A setting temperature of 120 to 240° C., preferably 150 to 220° C., is usually employed. The heat setting is usually conducted for a time period of 1 minute to 2 hours or longer. Obviously, the temperature employed should be below that temperature which would permanently alter the properties of the shaped polyester article of manufacture.

In accordance with the process of this invention, excellent and substantially permanent destaticization of the molded articles can be obtained employing steps which can be conducted in a very simple manner.

The percentages set forth herein are percent by weight.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the examples hereinafter, to determine the antistatic effect, the half life of the static charge is measured, after charging with a constant voltage of 500 volts in a standard atmosphere (23° C., 50% relative humidity). This half life, for untreated molded articles of linear synthetic molded polyesters, is >300 sec. Additional characteristic data which are set forth hereinafter are the maximum charging of the sample achieved by stroking the sample ten times with a cotton cloth (measured in a standard atmosphere at a distance of 1 cm. in front of the measuring head of the field strength measuring device of Schwenkhagen), and the charge remaining after 1 minute. The holding device is grounded so that the specimens can discharge.

In the examples hereinafter the following compounds of this invention are antistatic compounds employed therein: N-(2-hydroxyethyl)-N-(2-lauroyloxyethyl)-lauric acid amide (A); N-[(2 - hydroxy-2-methyl)-ethyl]-N-(2-lauroyloxy-ethyl)-lauric acid amide (B); and N-[(2-hydroxy - 2 - methyl)-ethyl]-N-(2-lauroloxyethyl)-acetamide (C).

EXAMPLE 1

A woven fabric of 100% of poly-[ethylene glycol terephthalate] is treated with an antistaic agent shown in the table below in a perchloroethylene bath. Thereafter, the excess solution is squeezed out to obtain a coating of 3% of antistatic agent. After drying at 100° C., the heat setting step is conducted for 2 minutes at 160° C.

The maximum charging and the 1-minute value demonstrate the antistatic effectiveness of the treatment compared with an untreated sample.

| | Antistatic compound | Maximum charging, kv./m.[1] | 1-minute value kv./m. |
|---|---|---|---|
| Experiment: | | | |
| 1 | Untreated | −650 | −500 |
| 2 | A | −280 | −15 |
| 3 | B | −350 | −2 |
| 4 | C | −200 | ±0 |

[1] Kilovolt/meter.

EXAMPLE 2

A woven fabric of 100% of poly-[1,4-bis-(hydroxymethyl)-cyclohexane terephthalate] is treated as described in Example 1 with an antistatic agent of this invention. The table shows the maximum charging and the 1-minute value, as well as these values after gentle laundering, once and five times, with a mild detergent. The values after gentle laundering five times at 60° C. demonstrate (Experiments 1 and 2) a better permanence of antistatic effect than in the comparative example which follows employing a commercially available permanent antistatic agent (Nonax®, produced by Böhme-Fettchemie, Düsseldorf— a polyamine/epoxy resin).

| Experiment | Antistatic compound | Maximum charging, kv./m. | 1-minute value, kv./m. |
|---|---|---|---|
| | Untreated | −800 | −600. |
| 1 | A | −15 | Immediate discharge. |
| 2 | B | −90 | Do. |
| 3 | C | −40 | Do. |
| LAUNDERED ONCE | | | |
| 1 | A | +9 | ±0. |
| 2 | B | −30 | Immediate discharge. |
| 3 | C | −60 | Do. |
| LAUNDERED FIVE TIMES | | | |
| 1 | A | −250 | −15. |
| 2 | B | −450 | −9. |
| 3 | C | −800 | −50. |

EXAMPLE 3

Small strands of yarn from 100% poly-[1,4-bis-(hydroxymethyl)-cyclohexane terephthalate] (10 g. each) are treated with a 5% emulsion of N-[(2-hydroxy-2-methyl) - ethyl]-N-(2-lauroyloxyethyl)-acetamide. Then, the strands are squeezed, thus attaining an application of the antistatic agents of 3–4%. After drying at 100° C., the heat setting step is conducted at 140° C. for 2 hours. The half life of the electric discharge is measured with a constant charging by a battery (500 volts). Thereafter, the strands of yarn are carrier dyed for 2 hours at 98° C. to determine the permanence of the treatment. The table below demonstrates that the treated yarns have an excellent antistatic effect even after dyeing.

| Antistatic compound | Application, percent by weight | Half life of electric dischrge (seconds) | |
|---|---|---|---|
| | | Prior to dyeing | After dyeing |
| Untreated | | >300 | >300 |
| C | 2.4 | 1.0 | 12 |
| C | 2.5 | 0.9 | 9 |
| C | 2.6 | 1.2 | 14 |
| C | 2.7 | 0.9 | 10 |
| C | 3.0 | 0.9 | 7 |
| C | 3.5 | 3.5 | 3 |
| C | 3.6 | 2.5 | 3 |
| C | 3.8 | 3.5 | 3 |
| C | 3.8 | 7.5 | 6 |
| C | 3.9 | 3.0 | 4 |

Comparative example

A fabric of 100% of poly-[1,4-bis-(hydroxymethyl)-cyclohexane terephthalate] is treated in an aqueous-alkaline bath with a commercially available permanent antistatic agent Nonax® (a polyamine/epoxy resin), squeezed, and dried, so that a take-up of the antistatic agent of about 3% is attained.

The table below shows the maximum charging and the 1-minute value after stroking with a cotton cloth, as well as the corresponding values after laundering once and five times with a commercially available mild detergent in the "delicates" cycle of the washing machine at 60° C.

| | Maximum charging, kv./m. | 1-minute value, kv./m. |
|---|---|---|
| Prior to laundering | −70 | Immediate discharge. |
| Laundered once | −225 | Do. |
| Laundered 5 times | −675 | −45. |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the antistatic treatment of shaped articles of linear crystallizable polyesters, which comprises applying to the surface thereof an antistatically effective amount of an antistatic compound of the formula

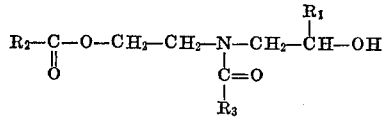

wherein $R_1$ is hydrogen or methyl and $R_2$ and $R_3$ each is an aliphatic group containing 1 to 17 carbon atoms, inclusive, at least one of which contains 11 to 17 carbon atoms, inclusive, and thereafter heating the shaped articles to heat-set the antistatic compound thereon and render the antistatic treatment permanent.

2. A process according to claim 1 wherein $R_2$ and $R_3$ each are selected from the group consisting of methyl, ethyl, propyl, isopropyl, butyl, isobutyl, pentyl, hexyl, heptyl, octyl, undecyl, pentadecyl and heptadecyl.

3. A process according to claim 2 wherein $R_2$ and $R_3$ together contain a total of up to 22 carbon atoms.

4. A process according to claim 3 wherein at least one of $R_2$ and $R_3$ is undecanyl.

5. A process according to claim 1 wherein 0.1 to 10% of the antistatic compound, calculated on the weight of the shaped article, is applied thereto and is thereafter heat set thereon at a temperature of 120 to 240° C.

6. A process according to claim 5, wherein the heat setting step is conducted at a temperature of 150 to 220° C.

7. A process according to claim 5, wherein $R_2$ and $R_3$ each are selected from the group consisting of methyl, ethyl, propyl, isopropyl, butyl, isobutyl, pentyl, hexyl, heptyl, octyl, undecyl, pentadecyl and heptadecyl.

8. A process according to claim 7 wherein $R_2$ and $R_3$ together contain a total of up to 22 carbon atoms.

9. A process according to claim 8 wherein at least one of $R_2$ and $R_3$ is undecanyl.

10. A process according to claim 1, wherein 1 to 5% of the antistatic agent is heat set onto the surface of the article.

11. Shaped articles of manufacture of linear crystallizable polyesters having substantially uniformly distributed on the surface thereof an antistatically effective amount of an antistatic compound of the formula

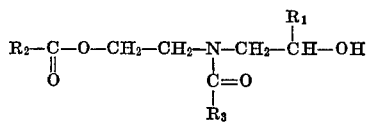

wherein $R_1$ is hydrogen or methyl and $R_2$ and $R_3$ each is an aliphatic group containing 1 to 17 carbon atoms, inclusive, at least one of which contains 11 to 17 carbon atoms, inclusive.

12. Polyester articles of manufacture according to claim 11 in film form or in the form of threads, fibers or yarns or woven or knitted fabrics formed therefrom.

13. Polyester articles of manufacture according to claim 11 wherein $R_2$ and $R_3$ each are selected from the group consisting of methyl, ethyl, propyl, isopropyl, butyl, isobutyl, pentyl, hexyl, heptyl, octyl, undecyl, pentadecyl and heptadecyl.

14. Polyester articles of manufacture according to claim 13 wherein $R_2$ and $R_3$ together contain a total of up to 22 carbon atoms.

15. Polyester articles of manufacture according to claim 14, wherein at least one of $R_2$ and $R_3$ is undecanyl.

References Cited

UNITED STATES PATENTS

| 3,468,702 | 9/1969 | Gallaugher et al. 117—139.5 CQ X |
| 2,877,246 | 3/1959 | Schurman 260—404 |
| 3,212,927 | 10/1965 | Williams 117—138.8 B |
| 3,230,183 | 1/1966 | Valko et al. 252—8.8 X |
| 3,425,863 | 2/1969 | Honig et al. 252—8.8 X |

RALPH HUSACK, Primary Examiner

U.S. Cl. X.R.

8—18; 117—139.5 CQ; 252—8.8; 260—404